United States Patent [19]

Bez et al.

[11] 4,429,914
[45] Feb. 7, 1984

[54] SUPPORT SYSTEM FOR THE BODY OF A MOTOR VEHICLE, ESPECIALLY A PASSENGER CAR

[75] Inventors: Ulrich Bez, Gerlingen; Gerhard Schroder, Ditzingen; Michael Rauser, Kornwestheim, all of Fed. Rep. of Germany

[73] Assignee: Dr. Ing.h.c.F. Porsche AG, Fed. Rep. of Germany

[21] Appl. No.: 307,317

[22] Filed: Sep. 30, 1981

[30] Foreign Application Priority Data

Oct. 15, 1980 [DE] Fed. Rep. of Germany ....... 3038920

[51] Int. Cl.³ .............................................. B62D 21/00
[52] U.S. Cl. .................................... 296/188; 293/107; 296/189; 296/194; 296/198
[58] Field of Search ............... 296/194, 198, 188, 189; 293/107, 109, 110

[56] References Cited

U.S. PATENT DOCUMENTS

| | | | |
|---|---|---|---|
| 3,819,224 | 6/1974 | Casey | 296/188 |
| 3,827,525 | 8/1974 | Felzer | 296/189 |
| 4,183,574 | 1/1980 | Klie | 296/198 |

*Primary Examiner*—Bruce H. Stoner, Jr.
*Assistant Examiner*—John A. Carroll
*Attorney, Agent, or Firm*—Craig & Burns

[57] ABSTRACT

A support system for the body of a motor vehicle, especially a passenger car, is constructed as at least part of a fender, extending between one of the walls of the passenger compartment and one end part of the vehicle. The support system comprises an inner wall component and an outer wall component which are relatively equally subdivided into forward and rear sections along their length. The forward section and rear section of the support system meet in an area at which chassis-connection elements are located and together the wall components define strengthening and force-absorbing structures which extend in a vehicle longitudinal direction, the structures being constructed so as to be less resistant to deformation in the forward section than in the rear section. In accordance with a preferred embodiment the structures comprise at least two superposed, substantially parallel frame-like members. More particularly, the structures are formed by deformations in the wall components and create frame-like members that are hollow and tubular with flanges extending upwardly and downwardly therefrom.

16 Claims, 9 Drawing Figures

SUPPORT SYSTEM FOR THE BODY OF A MOTOR VEHICLE, ESPECIALLY A PASSENGER CAR

BACKGROUND AND SUMMARY OF THE INVENTION

The invention relates to a support system for the body of a motor vehicle, especially a passenger car, constructed at least partially in the form of a fender extending between one of the walls of the passenger compartment and one end part of the vehicle, and comprising a frame member-reinforced wall.

A known support system of the cited type comprises a fender wall reinforced by a longitudinal frame member limiting the bottom of the support system. This structure entails the disadvantage of difficulty in obtaining a definite energy absorption.

To eliminate this disadvantage it is known (German application No. 2,619,173) to constitute the support system of successive zones formed exclusively by longitudinal frame members of different configuration. In this case the disadvantage is that the one-piece fender wall is not utilized to form the zones or the frame members, so that the fender wall-frame member system is not designed for optimized energy absorption. In addition, the support system is suitable only in steel plate structures.

An object of the invention is therefore to supply a support system which, besides definite energy absorption, provides for high rigidity and permits the use of relatively high-weight materials, e.g. light metals.

Principal advantages derived from the invention include that the support system absorbs the strong forces generated during vehicle operation with the shaped structures, and that a definite energy absorption is assured on collision. This support system also permits the use of thin metal sheets, since in such an application the light metal sheets must be relatively thin for reasons of fabrication (shaping, welding, etc.). The desired force-motion specifications can also be obtained by simple means with the support system. In addition, after carrying out its energy-absorbing function, the support system can be partially or totally replaced.

These and further objects, features and advatages of the present invention will become more obvious from the following description when taken in connection with the accompanying drawings which show, for purpose of illustration only, a single embodiment in accordance with the present invention.

DETAILED DESCRIPTION OF THE PREFERRED EMBODIMENT

Figure 1:
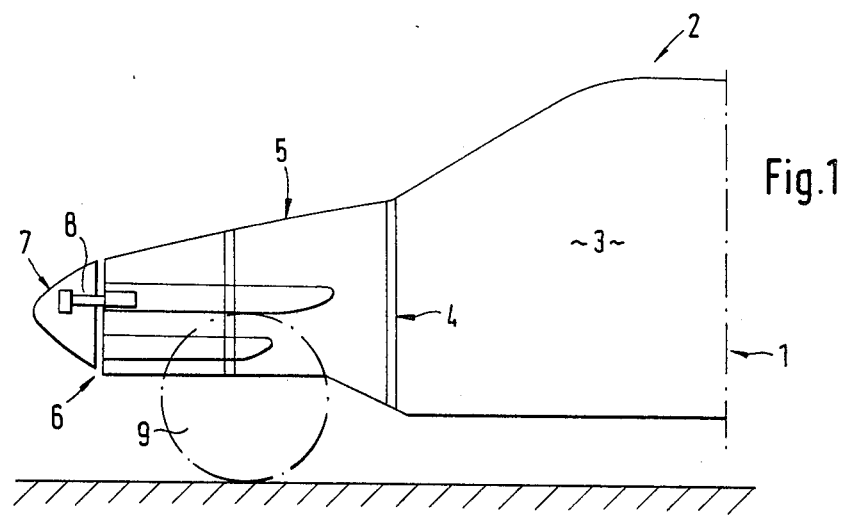
FIG. 1 represents the front of a motor vehicle seen from the side.

The passenger car 1 represented in FIG. 1 comprises a body 2 and a passenger compartment 3 separated by a wall 4 from a support system 5 in the form of a longitudinal supporting and shock absorbing wall arrangement constructed as at least part of a fender of the car.

Support system 5 extends from wall 4 to the end part 6 of passenger car 1, i.e. the front in the illustrated embodiment. The end part 6 is provided with a bumper 7 comprising an elastic cover and a rigid support and is connected by a shock damper 8 to support system 5. A wheel 9 is also connected to support system 5 by wheel guiding members (not shown).

Support system 5 comprises an inner component 10 and an outer component 11 (FIG. 3) along a substantial portion of its length. These components, which are advantageously made of light metal, are provided with shaped structures 12, 13 and 14 whose forward section A and rear section B (FIG. 2) are deformable. Section A extends from end part 6 to a point located near chassis-connection elements 15 and 16. The height of support system 5 is determined by the shape of a bottom edge and the surface of a cap (not shown).

Figure 3:
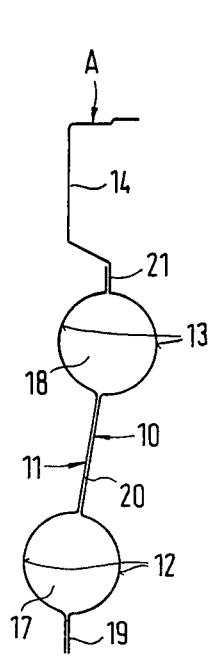
FIG. 3 is a section along line III—III in FIG. 2.

In forward section A structures 12 and 13 form two superposed members 17 and 18 of substantially equal circular cross section (FIG. 3). To obtain a different energy-absorption characteristic a plurality of, for example three, superposed members can be provided.

Figure 2:
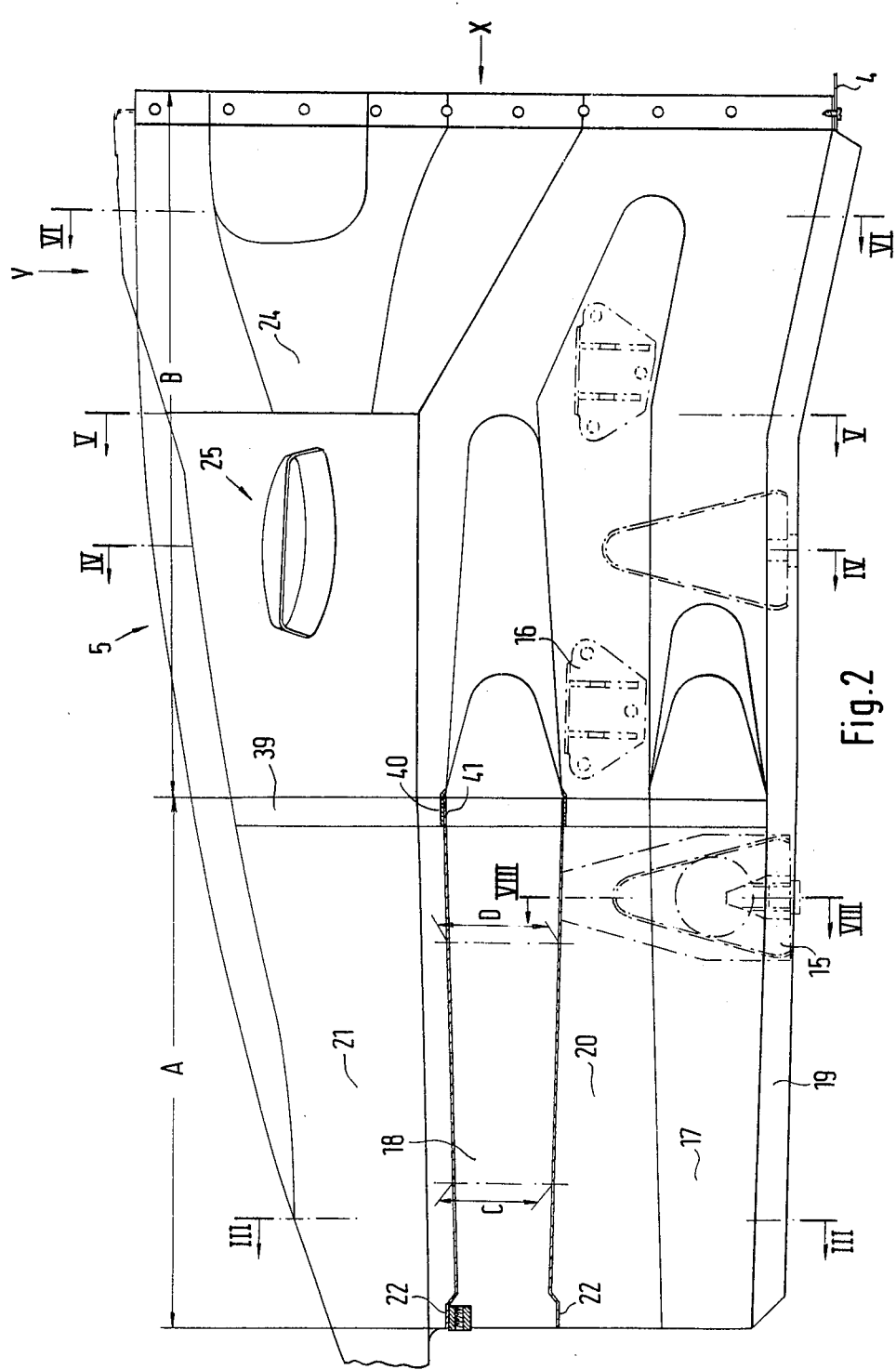
FIG. 2 is a partial view of FIG. 1, partly in section, on a larger scale.

The cross section of members 17 and 18 increases uniformly along section A (distances C and D) to improve the energy absorption (FIG. 2).

Inner component 10 and outer component 11 meet outside of members 17 and 18 and are connected at flanges 19, 20 and 21 by suitable means, for example by bolting, welding, riveting, etc. (FIG. 3).

To receive the forces resulting from collision impact effectively, upper member 18 is designed to carry shock damper 8. The front part of member 18 may be provided with an expanded portion 22 (FIG. 2).

Figure 5:
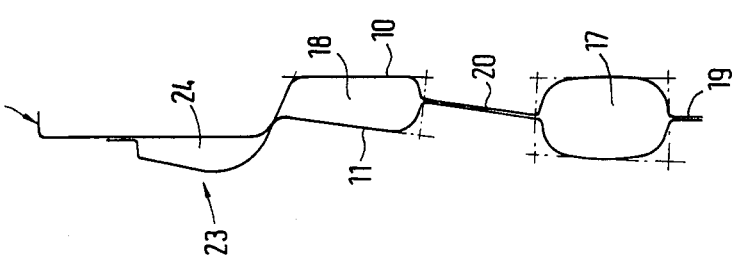
FIG. 5 is a section along line V—V in FIG. 2.
Figure 7:
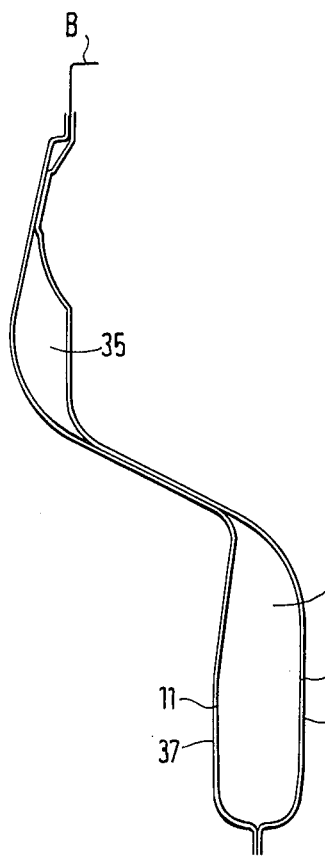
FIG. 7 is a view in the direction of arrow X in FIG. 2.
Figure 8:
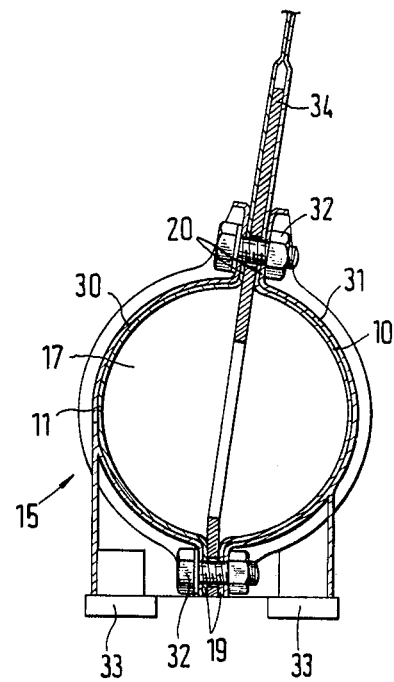
FIG. 8 is a section along line VIII—VIII in FIG. 2 on a larger scale.

Members 17 and 18 continue in the rear section B (e.g. FIG. 5) and their circular cross section changes to a substantially polygonal, possibly rectangular, and larger cross section to constitute torsion resistant elements.

Figure 6:
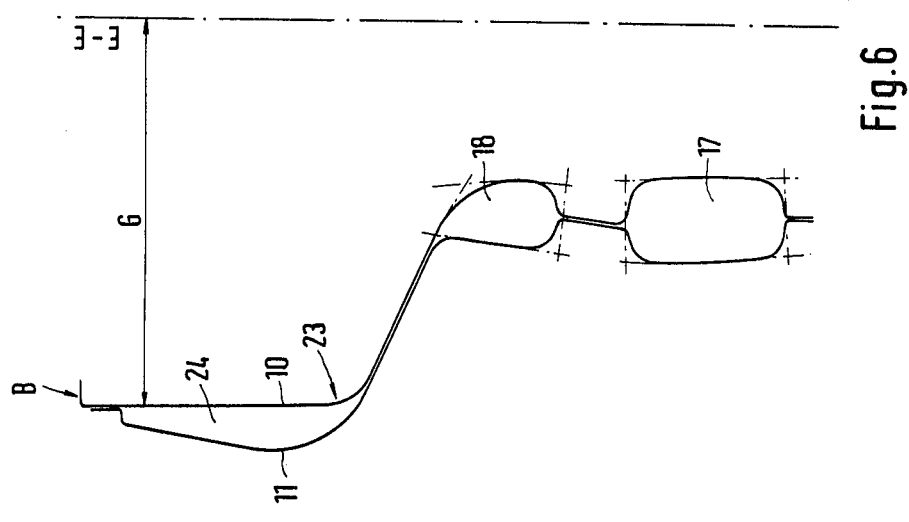
FIG. 6 is a section along line VI—VI in FIG. 2.

Near wall 4, but above members 17 and 18, support system 5 comprises a region 23 (FIGS. 5, 6 and 9) which extends further away from the median longitudinal plane E-E of the vehicle (distance G, FIG. 6), and in which another member 24 is provided.

Figure 4:
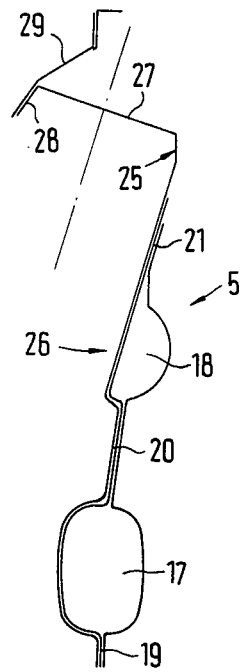
FIG. 4 is a section along line IV—IV in FIG. 2.

A shock absorber holder 25 is provided in support system 5 (FIG. 4). Near the shock absorber holder 25 is a reinforcement 26 which overlies the component 11 over its full height. The shape of reinforcement 26 is adapted to that of members 17 and 18 and flanges 19, 20 and 21. The reinforcement is connected to support system 5 by a suitable method, e.g. by welding or bolting. The upper end of reinforcement 26 is provided with a cup-shaped holder 27 whose free portion 28 is in contact with an abutment element 29 of the vehicle body.

A chassis-connection element 15 consisting of two half shells 30 and 31 extends around member 17 and is fixed by bolts 32 at flanges 19 and 20. Threaded elements 33 are attached to half shells 30 and 31 to hold portions of chassis (not shown). A reinforcing plate 34 made of light metal and also secured by bolts 32 is arranged at half shells 30 and 31 between inner component 10 and outer component 11. Chassis-connection element 16 is a bracket-type connector for attaching intermediate flange 20 to the vehicle chassis. Element 16 comprises a generally trapezoidal, slotted plate bolted to flange 20 by, for example, three bolts passing through the flange. A pi-shaped chassis bracket is connectable thereto. A second set of chassis-connection elements 15',16', which are like elements 15, 16, respectively may be provided as shown in FIG. 2 (but have been omitted from the sectional views of FIGS. 4, 5 for illustration purposes).

Figure 9:
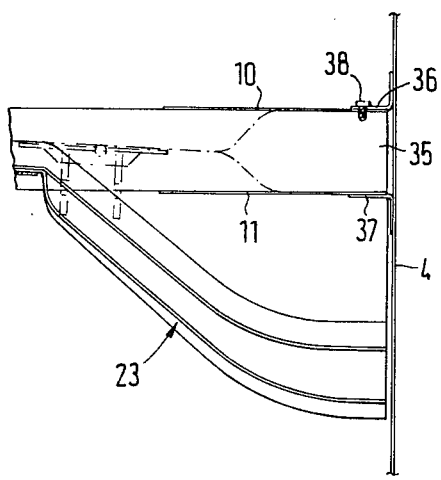
FIG. 9 is a partial view in the direction of arrow Y in FIG. 2.

To facilitate repairs support system 5 is detachably secured to wall 4 (FIG. 9). For this purpose wall 4 is provided with a passage 35 into which the inner component 10 and outer component 11 of support system 5 are introduced and fixed to walls 36 and 37 by screws 38.

Forward section A and rear section B are united along a substantially vertical joint seam 39 (FIG. 2). Joint seam 39, which is accessible after the removal of an exterior fender body panel (not shown), is formed by the overlapping portions 40 and 41 of forward section A and rear section B. These portions of sections A and B are interconnected by spot welding. Said portions may also be united by bolts.

If support system 5 is subjected to impact, for example at a speed of 8-30 km/hr only forward section A is utilized to absorb the energy. At higher speeds impact energy is absorbed also by rear section B. Depending on the deformation of support system 5 only forward section A or both sections A and B are removed from the vehicle and then replaced.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A support structure constructed as at least part of a fender for the body of a motor vehicle and adapted to absorb forces by deformation, the support structure extending between one of the walls of a passenger compartment and one end part of the vehicle and providing for the connection of chassis elements, said support structure comprising support means including a forward section and a rear section interconnected intermediate said one wall of the passenger compartment and said one end part of the vehicle, said forward section and said rear section each including inner wall means and outer wall means cooperating to form at least one frame-like member and said at least part of a fender, said support means adapted for supporting said passenger compartment relative to said chassis elements, and for deforming to absorb the energy of forces greater than a predetermined amount, said forward section adapted to be less resistant to deformation than said rear section.

2. The support structure as in claim 1, wherein, at least in the forward section, said at least one frame-like member includes at least two superposed, substantially parallel frame-like members.

3. The support structure as in claim 2, wherein the cross section configuration of the frame-like members is substantially circular along at least a portion of their length.

4. The support structure as in claim 3, wherein the diameter of the circular cross section configuration of the frame-like members are substantially equal.

5. The support structure as in claim 2 or 4, wherein the cross section configuration of the frame-like members increases in the longitudinal direction from the end part toward the passenger compartment.

6. The support structure as in claim 2, wherein an upper one of the frame-like members is designed to receive a shock damper.

7. The support structure as in claim 3, wherein the frame-like members extend into the rear section, the circular cross section thereof changing to a substantially polygonal cross section.

8. The support structure as in claim 2 or 7, wherein, near the wall of the passenger compartment, above the frame-like members, the support means includes a region which is spaced further away from a median longitudinal plane of the vehicle and contains an additional frame-like member.

9. The support structure as in claim 2, wherein a reinforcement is provided, connecting the frame-like members, and extending above the height of the wall means at the outer wall means, a cup-shaped shock absorber holder being provided thereon.

10. The support structure as in claim 2, wherein a lower of the frame-like members is attached to the vehicle chassis by chassis-connection elements comprising two half shells extending around the lower frame member and interconnected by detachable fasteners at substantially vertical flanges.

11. The support structure as in claim 1, wherein the inner wall means and the outer wall means of the support structure are detachably secured to the wall of the passenger compartment by fasteners.

12. The support structure as in claim 1, wherein the forward section and the rear section of the support system are separately manufactured, and interconnected along a substantially freely accessible, separable joint seam.

13. The support structure as in claim 1 or 2 wherein said frame-like members are hollow tubular members with flanges extending upwardly and downwardly therefrom.

14. The support structure as in claim 13, wherein said frame-like members are formed by deformations in said wall means.

15. A support structure as set forth in claim 1, wherein said inner wall means and said outer wall means cooperate to form at least two frame-like members.

16. A support structure as set forth in claim 1, wherein said at least one frame-like member has a cross sectional configuration which increases in the longitudinal direction of the vehicle from the one end part toward the passenger compartment.

* * * * *